July 6, 1954

A. H. HAWLEY, SR 2,682,941

MACHINE TOOL TRANSMISSION

Filed Nov. 30, 1948

INVENTOR.
AMOS H. HAWLEY, SR.
BY
H. N. Parsons & L. W. Wright
ATTORNEYS

July 6, 1954  A. H. HAWLEY, SR  2,682,941
MACHINE TOOL TRANSMISSION
Filed Nov. 30, 1948  4 Sheets-Sheet 2

INVENTOR.
AMOS H. HAWLEY, SR.
BY
H. K. Parsons & L. W. Wright.
ATTORNEYS

July 6, 1954     A. H. HAWLEY, SR     2,682,941
MACHINE TOOL TRANSMISSION

Filed Nov. 30, 1948     4 Sheets-Sheet 3

INVENTOR.
AMOS H. HAWLEY, SR.
BY
H. K. Parsons + L. W. Wright
ATTORNEYS

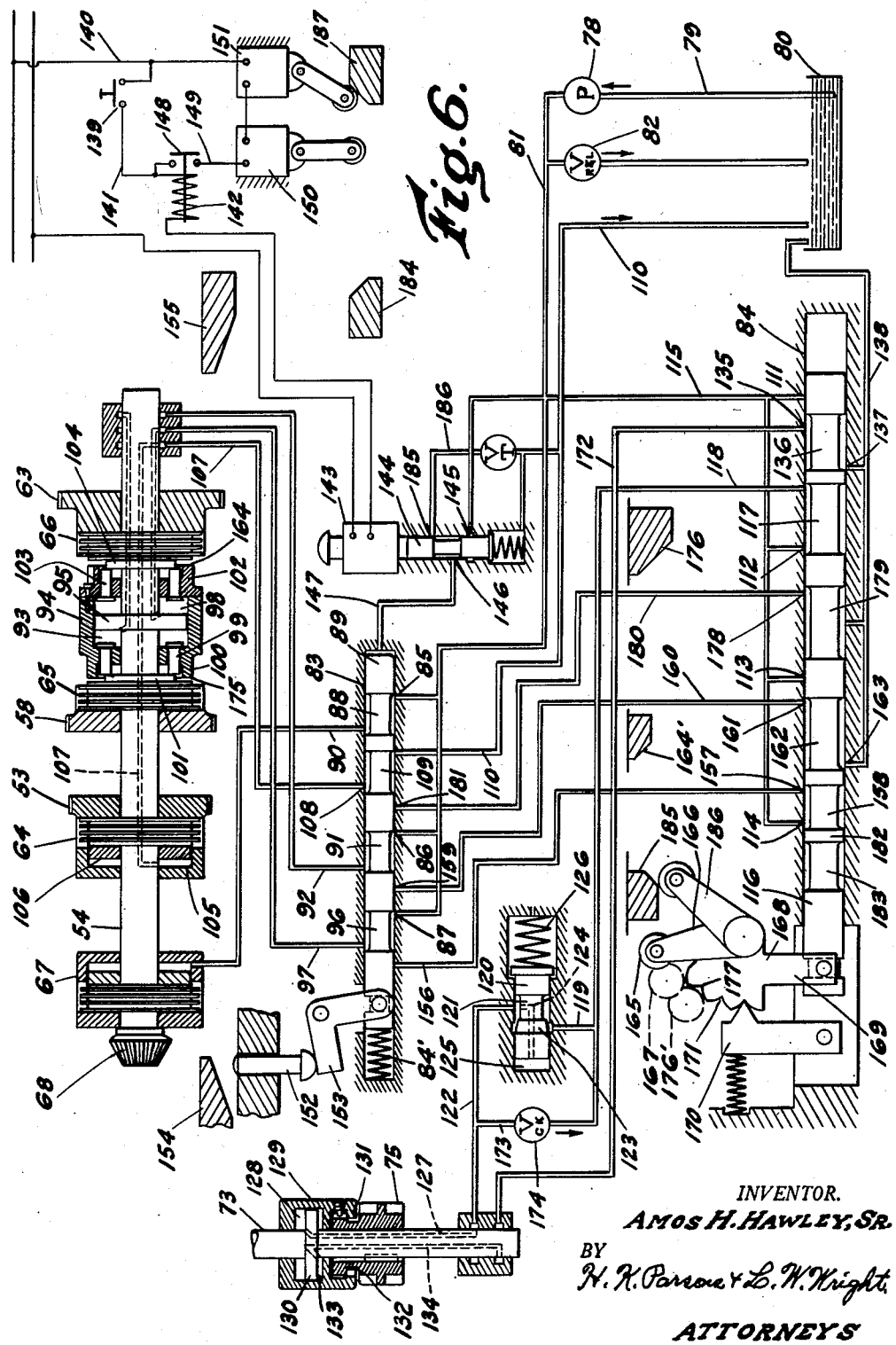

Patented July 6, 1954

2,682,941

UNITED STATES PATENT OFFICE 2,682,941

MACHINE TOOL TRANSMISSION

Amos H. Hawley, Sr., Cupertino, Calif., assignor to The Cincinnati Milling Machine Co., Cincinnati, Ohio, a corporation of Ohio Application November 30, 1948, Serial No. 62,655

10 Claims. (Cl. 192—4)

This invention relates to machine tools and more particularly to improvements in transmission mechanisms.

One of the objects of this invention is to provide an improved single prime mover driven transmission mechanism having a plurality of branches which is so contrived that simultaneous full power demand by the branch transmissions on the prime mover is prevented to thereby limit the capacity of the prime mover.

Another object of this invention is to control the power demand of a plurality of branch transmissions driven by a single prime mover that the full power demand of each branch occurs severally and sequentially, thus preventing overload on the prime mover.

A further object is to control the power demand on a single prime mover connected for driving a plurality of branch transmissions that the full power demand of each branch transmission does not occur simultaneously and thus overload the prime mover.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 6 is a diagrammatic view of the control circuit for the machine.

It is recognized that in machining certain materials, such as cast iron for instance, that it is more economical to remove the hard scaly surface by a milling operation and then finish the surface by a broaching operation. Although this ordinarily requires the use of two different machines plus the time required to set up on both machines it was found that the increase in the length of cutter life of the broaching tools was enough to make this procedure economical.

By means of this invention however a single machine has been provided for performing these two different types of operations in a single set-up of the work piece and in automatic succession. The two operations are different in their requirements in that a milling operation requires power operable means for effecting the relative feeding movement between the tool and the work and power operable means for rotating the cutter during the feeding movement while in a broaching operation it is only necessary to provide a power operable means for effecting the feeding movement, but due to the nature of the cutting action many times more power is required to effect the feeding movement for broaching than is required for a milling operation. Ordinarily, this would require two different power systems, but by means of this invention a single prime mover and transmission mechanism has been so contrived that the power output capacity of the prime mover is sequentially directed to the feeding branch transmission and the cutter rotating branch transmission whereby upon abatement of the cutting action, which automatically reduces the power demand of the cutting branch transmission so that the entire power output is then caused to flow to the feeding branch transmission so that the feed rate can be materially increased even though the resistance of the broaching action has also been increased without overloading the prime mover.

Figure 1:
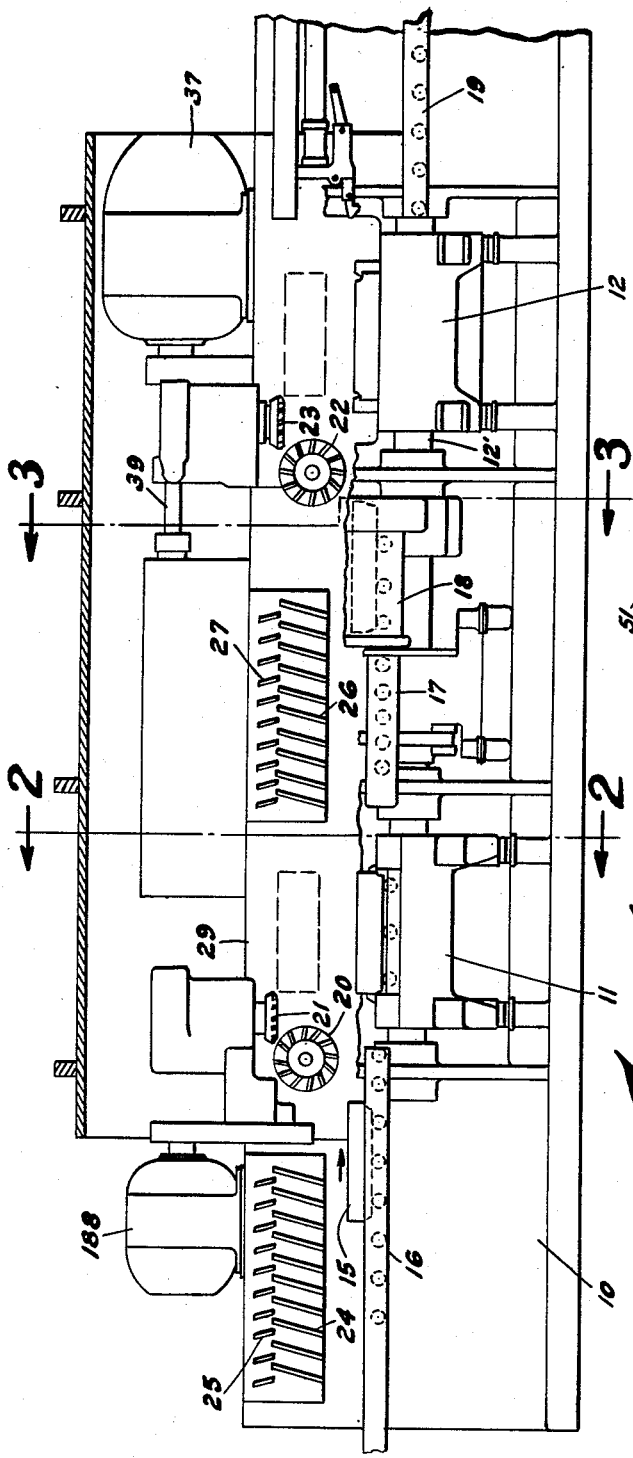
Figure 1 is a view in elevation of a machine embodying the principles of this invention.
Figure 2:
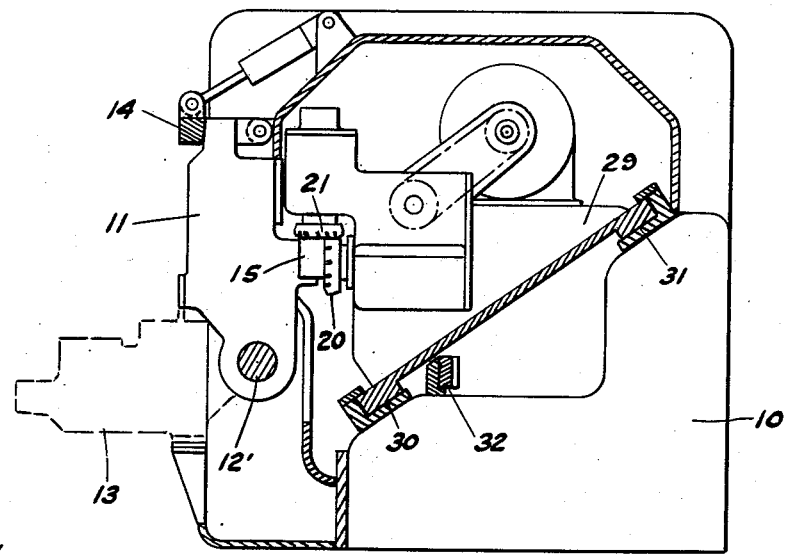
Figure 2 is a section on the line 2—2 of Figure 1.
Figure 3:
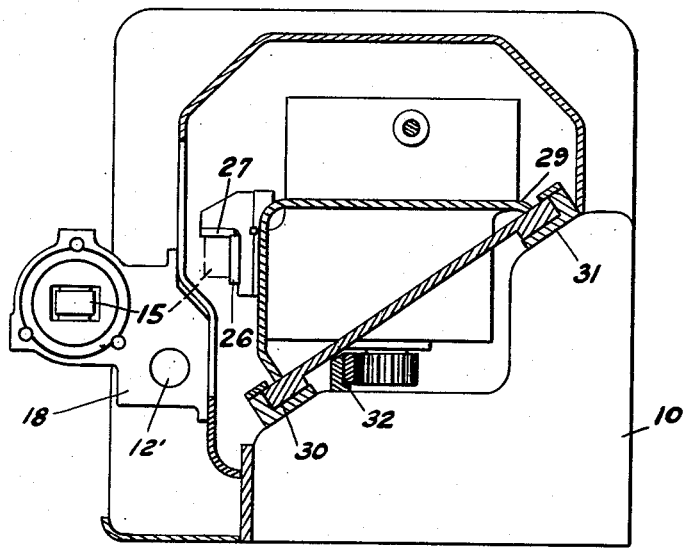
Figure 3 is a section on the line 3—3 of Figure 1.

Referring now to the drawings, the general construction of a machine embodying the principles of this invention is shown in Figure 1 in which the reference numeral 10 indicates, in general, the bed structure of the machine. There is mounted upon the front of the machine, as shown in Figures 1, 2, and 3, two pivoted work support units indicated by the reference numerals 11 and 12. As shown in Figure 2, the work support 11 is adapted to swing about a fixed pivot 12' for movement from a horizontal position shown in dotted lines and indicated by the reference numeral 13, which is the loading position, to a vertical or cutting position. When the work fixture is swung to cutting position it is secured by suitable clamping mechanism indicated generally by the reference numeral 14.

The work pieces, one of which is indicated by the reference numeral 15 in Figure 1, may come to the machine on a conveyor 16 from which it may be moved by the operator into the fixture 11 while it is in a horizontal position. In this particular case, the work piece is substantially rectangular in shape and while in the first fixture 11 one face and one side are machined simultaneously, and then the work piece is moved on a second conveyor section 17 into a rollover device indicated generally by the reference numeral 18. This device rotates through an angle of 180 degrees which, in effect, turns the work piece over, and then it is moved into the second fixture 12 where the opposite face and side are simultaneously machined, with the result that the four longitudinal faces of the work are finished in the one machine. The work is now moved to an exit conveyor section 19. The particular mechanism for operating the fixtures and clamping the work does not constitute part of this invention, and therefore details of their operation are omitted, it being sufficient to understand this invention to say that the two fixtures are moved into cutting position at the same time whereby two faces of each work piece are simultaneously milled and broached. It will thus be evident that upon each retraction of the work fixtures a finished work piece leaves the machine from the second fixture 12; that a semi-finished work piece moves from the rollover to the second fixture; while a third work piece moves from the first fixture 11 into the rollover; and a rough work piece moves into the first fixture 11.

In this machine a first pair of milling cutters 20 and 21 are provided for milling two intersecting faces of a work piece held in fixture 11, and a second pair of milling cutters 22 and 23 are provided for milling the other two intersecting faces of a work piece held in fixture 12. In addition, two sets of broaching tools, one indicated generally by the reference numeral 24, and the second indicated by the reference numeral 25 are provided for broaching the two surfaces milled by cutters 20 and 21, it being understood that the cutting edges of the broaching tool 25 are angularly arranged with respect to the cutting teeth of the broaching tool 24 in the same manner as the broaching tools 26 and 27 shown in Figure 3.

The second set of broaching tools indicated by reference numerals 26 and 27 are provided for broaching the intersecting faces of the work which are milled by the cutters 22 and 23 respectively.

All of these cutting tools are mounted on a single ram indicated generally by the reference numeral 29, and this ram is slidable on inclined guideways 30 and 31 as more particularly shown in Figures 2 and 3. The ram is advanced on the cutting stroke a sufficient distance to move both the milling cutters and the broaching tools past their respective work pieces and in a single continuous stroke.

In general, the cycle of operation of the machine is as follows. Both of the work fixtures are swung to a cutting position, the ram is then advanced at a suitable feeding rate for milling with the cutters rotating which thus accomplishes the milling operation. As soon as the milling cutters have completed removal of the material which will occur before the cutters have passed beyond the work due to the fact that they are face milling cutters, the rate of ram movement is increased many times its milling rate; in the present case about ten or twelve times as fast, and the broaching operation is then performed. As soon as the broaching tools have completed their work the movement of the ram is stopped, the work fixtures are retracted to a loading position and the ram is then returned at a rapid traverse rate. The ram stops in the starting position until the work fixtures have been reloaded, whereupon the cycle of operation is repeated.

The ram is moved by a mechanical transmission terminating in rack and pinion means, the rack being indicated by the reference numeral 32, which, as shown in Figures 2 and 3, is fixed to the bed unit 10.

Figure 4:
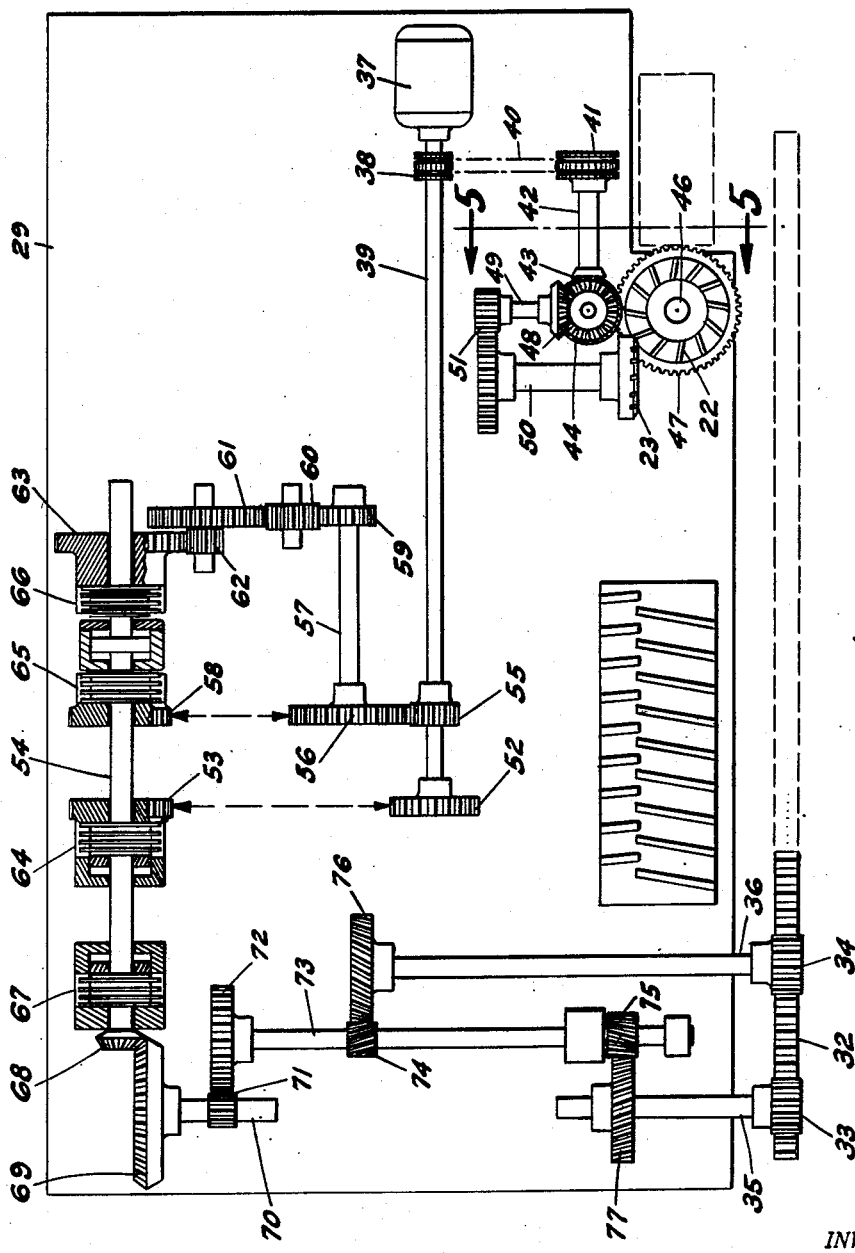
Figure 4 is a diagrammatic view of the transmission mechanism of the machine shown in Figure 1.

As shown in Figure 4, a pair of pinions 33 and 34 intermesh with the rack, and by effecting rotation of these pinions, which are carried by the shafts 35 and 36 respectively which are journaled in the ram 29, movement of the ram will result.

A compact and efficient transmission has been provided which is shown more or less diagrammatically in Figure 4, and this transmission is driven by a single prime mover indicated by the reference numeral 37, the transmission comprising one branch for rotating a pair of milling cutters, and a second branch for translating the ram.

Figure 5:
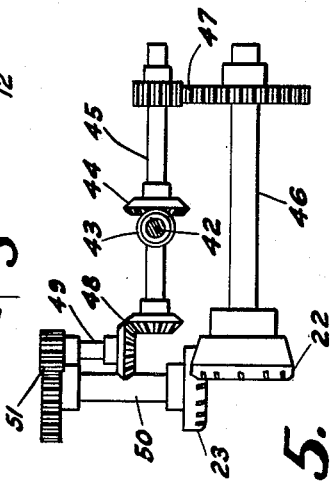
Figure 5 is a view of the cutter driving train.

The branch transmission to the pair of milling cutters 22 and 23 is driven from a sprocket wheel 38 secured to a shaft 39 which is connected to the motor 37, and this shaft is continuously driven whenever the motor is operated. The sprocket 38 is connected by a chain 40 to a chain sprocket wheel 41 secured to the end of a shaft 42. This shaft carries a bevel pinion 43 which as shown in Figure 5 meshes with bevel gear 44 mounted on shaft 45. The shaft 45 is connected to cutter spindle 46 by a pair of spur gears 47. The shaft 45 is also connected by a pair of bevel gears 48 to a vertical shaft 49 that is in turn connected to the other cutter spindle 50 by a pair of spur gears 51. Since the cutter 22 is mounted on the spindle 46 and the cutter 23 is mounted on the spindle 50 it will be apparent that these two cutters are continuously rotated whenever the prime mover 37 is running. Thus, it will be noted that the expense of clutches in this branch is eliminated.

Since the ram is translated at three different rates, three different branch transmissions are provided for producing each of these rates, and these are all actuated from the shaft 39. Thus, the shaft 39 is provided with a gear 52 which meshes directly with gear 53 supported on the drive shaft 54. It will be noted that these gears are substantially of equal size whereby the gear 53 is rotated at substantially the same speed as the shaft 39, and this branch is utilized for effecting the rapid return movement of the ram.

The shaft 39 also has a gear 55 mounted thereon for driving an idler gear 56 secured to the end of a shaft 57. This pair of gears constitute reduction gears for effecting a slower rate of rotation of the shaft 57 which constitutes the actuator for driving the ram at the milling rate of feed. The gear 56 intermeshes with a gear 58 supported on the shaft 54, and since the gear 58 is somewhat larger than the gear 55 it will be rotated at a slower rate than the gear 53, and this drive comprising gears 55, 56, and 58 is utilized for effecting movement of the ram at a broaching rate of speed.

The shaft 57 is also connected through the branch gear train comprising gears 59, 60, 61, 62, and 63 to effect movement of the slide at a milling feed rate and it will be noted that the ratio of these gears is such as to cause rotation of the gear 63 at a much slower rate than the rate of rotation of the gear 58.

Thus, there are three parallel branch transmissions between the shaft 39 and shaft 54 arranged for producing three definite rates of rotation of shaft 54 for three definite purposes. The gears 53, 58, and 63 are supported for free rotation on the shaft 54 and are adapted to be connected to the shaft by clutches 64, 65 and 66 respectively.

In addition, a brake 67 is provided to facilitate stopping rotation of the shaft 54 especially when effecting reversal of movement of the slide as well as locking the parts when in stop position.

The shaft 54 has a bevel pinion 68 secured to the end thereof meshing with a bevel gear 69 secured to the end of a shaft 70. This shaft drives the pinions 33 and 34 through a pair of gears 71 and 72 secured respectively to shaft 70 and shaft 73. The shaft 73 is intermediate the shafts 35 and 36 and carries two spiral gears 74 and 75 which are of opposite hand, the gear 74 meshing with a spiral bevel gear 76 secured to shaft 36, and the gear 75 intermeshing with a spiral gear 77 secured to the shaft 35. The spiral pinions 74 and 75 are supported for relative axial movement on the shaft 73 for the purpose of eliminating backlash between the pinions 33 and 34 and the rack 32 in a manner to be described in connection with the control mechanism.

The control mechanism is shown in Figure 6 of the drawings. Actuation of the various clutches, brake and backlash eliminator are effected hydraulically from a source of pressure such as the pump 78 which has an intake 79 through which fluid is withdrawn from a reservoir 80 and delivered under pressure into the main supply line 81. This line has a relief valve 82 connected thereto by means of which a constant pressure may be established in the line 81. The circuit comprises chiefly two control valves, one of which is the start and stop control valve 83 and the other the selector valve 84. The stop valve is shown in Figure 6 in its stop position in which it is normally held by a spring 84'. It will be noted that this valve has three pressure ports 85, 86, and 87, all of which are connected to the main delivery line 81. The first port 85 is connected by a cannelure 88 in the stop valve plunger 89 to line 90 which leads to the hydraulic brake 67. Thus, the shaft 54 is held against rotation when the machine is stopped.

The port 86 is connected by cannelure 91 in plunger 89 to line 92 which leads to space 93 in cylinder 94 on one side of piston 95. The other pressure port 87 is connected through cannelure 96 in plunger 89 to line 97 which leads to the space 98 of cylinder 94 on the opposite side of piston 95. The piston 95 is integral with the shaft 54 and the shaft 54 is held against longitudinal movement whereby unequal pressures in the spaces 93 and 98 will cause the cylinder 94 to move axially with respect to the shaft 54. The cylinder 94 has a plurality of headed pins 99 which are slidably mounted in the cylinder head 100 and when pressure is admitted to the chamber 93 the pins 99 are pushed against a plate 101 fixed to the shaft 54. The other cylinder head 102 has a plurality of headed pins 103 slidably mounted therein for engagement with a plate 104 also fixed to the shaft 54. Thus, when pressure is admitted to both chambers 93 and 98, the pins 99 and 103 are forced into engagement with the fixed plates which thereby hold the cylinder 94 in a central position, and thus both of the clutches 65 and 66 are disengaged.

The clutch 64 has a cylinder 105 which is fixed to the shaft 54, and in the cylinder is a movable piston 106 for effecting engagement of the clutch.

The cylinder 105 is connected by a line 107 to port 108 of the stop valve and in the stop position shown this port is connected by a cannelure 109 to exhaust channel 110, which leads to the reservoir 80.

The selector valve 84 has four pressure ports 111, 112, 113, and 114 which are connected by the branch 115 to the main supply line 81. The valve plunger 116 of this valve is shown in the start position in Figure 6 in which it would normally cause movement of the tool ram to the right as viewed in Figure 1, except for the fact that the stop valve is in a stop position. Under this condition, there is only one pressure port which is effective and that is the port 112 which is shown connected by the cannelure 117 to channel 118 which leads to the backlash eliminator. This channel has a branch 119 connected to the pressure reducing valve plunger 120. This valve has a cannelure 121 by means of which the line 119 is connected to the line 122. The plunger has a tapered spool 123 which acts to throttle the flow from channel 119. The plunger 120 is interdrilled to form the passage 124 which serves as a communication between the annular groove 121 and the chamber 125 whereby pressure in the chamber will tend to move the valve plunger 120 toward the right and against the resistance of a spring 126. Thus, by adjusting the spring a predetermined pressure reduction can be made between the line 119 and 122. The fluid in line 122 flows through an interdrilled passage 127 in shaft 73 to a chamber 128 in cylinder 129 and on the upper side of a piston 130 which is fixed with the shaft 73. The shaft 73 being fixed against axial movement, the piston 130 is stationary whereby pressure in the chamber 128 will cause the cylinder 129 to move upward as viewed in Figure 6. The cylinder has a flange portion 131 which fits in a shifter groove 132 formed in the gear 75 whereby the gear is moved axially relative to the shaft 73 and due to the angle of inclination on the spiral gear 75 it will affect rotation of the pinion gear 33 shown in Figure 4 relative to the pinion gear 34 and thereby remove backlash in the drive. The other chamber 133 in the cylinder 129 is connected by channel 134 to port 135 in the selector valve 84. In the start position this port is connected by the cannelure 136 in plunger 116 to the reservoir port 137 which has the return line 138 connected thereto and leading to the reservoir 80.

The operator starts the machine by pressing the start button 139 which closes a circuit from the power line 140 through line 141 and holding relay 142 to solenoid 143. Energization of this solenoid shifts the valve plunger 144 connected thereto in a downward direction as viewed in Figure 6 to connect a pressure port 145, which is supplied by line 81, to port 146 and channel 147 leading to the right hand end of the start and stop valve 83. The hydraulic pressure acting on the end of plunger 89 shifts the same to the left, thereby closing the pressure ports 85, 86, and 87. The solenoid is kept energized by the holding relay 142 which, when energized, closes the switch 148 which completes a circuit through line 149 and serially connected limit switches 150 and 151 to line 140. Thus, although the operator releases the start button, the solenoid 143 will still be effective.

When the stop valve is shifted to the left as viewed in Figure 6 it raises a safety stop plunger 152 through the medium of a bell crank 153 operatively connected to the plunger whereby the stop plunger 152 may be engaged by safety dogs 154 or 155 positioned on the bed to prevent overtravel of the ram. Movement of the stop plunger 89 to the left connects line 97 by means of cannelure 96 to channel 156 which extends to port 157 of valve 84. Since the port 114 is a pressure port, pressure fluid will flow through the cannelure 158 and line 156 to the chamber 98 of cylinder 94. The other chamber 93 is connected to reservoir through channel 92, cannelure 91 of plunger 89, port 159, channel 160, port 161 of valve 84, cannelure 162 to exhaust port 163 which is connected to the reservoir line 138. The cylinder 94 will now move to the right and the annular surface 164 will squeeze the clutch plates of clutch 66 and thereby connect gear 63 to the shaft 54 to cause a movement of the ram at a milling rate. A dog 164' is set on the bed in such position that when the milling action of the cutters has abated the dog 164' will engage the trip lever 165 and rotate the crank 166 to the dotted line position indicated by the reference numeral 167. This will also cause rotation of the detent plate 168 which, through the arm 169, will shift valve plunger 116 to the right to an intermediate position in which it will be held by a spring pressed detent 170 engaging the notch 171 in the detent plate.

This will result in new connections being established by the selector valve. First, the pressure port 111 will be connected to port 135 through the cannelure 136 and fluid pressure will flow through the line 172 to the chamber 133 of the backlash eliminator, thereby moving the gear 75 downward as viewed in Figure 6. The upper chamber 128 will be connected to reservoir through the channel 127 and the bypass channel 173 and check valve 174 which are connected across the reducing valve 120 so that the fluid will now flow in the opposite direction through channel 118 and cannelure 117 to the exhaust port 137. This takes the backlash eliminator off during the broaching operation.

In addition, the pressure port 113 will be connected to port 161 through the cannelure 162 and fluid pressure will flow through line 160, port 159 of the stop valve to channel 92 through cannelure 91 whereby fluid pressure will enter chamber 93 of cylinder 94 and move the same to the left whereby the annular end face 175 will squeeze the clutch plates of clutch 65 and connect gear 58 to the shaft 54. This is possible because the other chamber 98 is connected to reservoir through channel 97, cannelure 96 and line 156 which terminates in port 157 which is now connected to the exhaust port 163 by virtue of the new position of the cannelure 158.

Attention is invited to the fact that the movement of the tool carrying slide during broaching is much faster than during the milling operation, in this machine the ratio being about twelve to one, with the result that much more power is required to move the slide at this faster rate and, in addition, the resistance of the broaching tools is much greater, with the result that a large increase in power is now required to be transmitted through the final drive shaft 54. During the milling operation most of the available power was being utilized so that this sudden increase in demand for power for the broaching operation would not be available but by timing the operation of the clutches at a point where the power requirement of the milling cutters had reduced almost to the vanishing point this power now becomes available for use in translating the slide at a satisfactory broaching rate.

When the broaching operation has been completed and the trip dog 176 shifts the trip lever 166 to a new position, indicated by the dotted lines 176', it thereby shifts the valve plunger 116 further to the right as viewed in Figure 6 until the detent 170 engages the detent notch 177. In this position the pressure port 112 now becomes connected to port 178 by way of a cannelure 179 in valve plunger 116 whereby fluid pressure will flow through channel 180 and port 181 of the stop valve to port 108 by way of cannelure 109 and channel 107 to clutch cylinder 105, thereby engaging the rapid traverse clutch 64 and connecting gear 53 to shaft 54. It will be noted that this gear rotated in an opposite direction to the other gears 58 and 63, and thereby will cause return movement of the slide. At the same time the spool 182 on the valve plunger 116 will be moved far enough to the right that cannelure 183 will connect pressure port 114 to port 157 whereby pressure fluid will flow through channel 156, cannelure 96 in the stop valve, and channel 97 to chamber 98 of cylinder 94. Since pressure still exists in the chamber 93 the pressure in chamber 98 will shift the cylinder 94 to the right until the cylinder head 100 engages the heads of the pins 99. In other words, the pressure in the chamber 93 while the clutch was engaged was only acting on the area of the cylinder head 100 minus the area of the ends of the pins 99 because the pins 99 were held against the stop plate 101 which prevented their movement to the left the same distance that the cylinder 94 moved to effect engagement of the clutch. The pressure in the chamber 98 thus momentarily acts on a larger area because at that time the pins 103 are not in engagement with the stop plate 104 and thus greater pressure can be exerted to cause movement toward the right which will continue until the cylinder head 100 engages the heads of the pins 99. The result is the disengagement of both clutches 65 and 66.

At the same time, however, that the dog 176 tripped the selector valve to its third position, another dog 184, mounted on the bed, operated the limit switch. Another dog 184 is carried by the ram and operates the limit switch 150, thereby breaking the circuit to the holding relay 142 which deenergizes the solenoid 143 so that the pressure in line 147 holding the stop valve 89 in a running position is now released through port 185 and channel 186 to the return line 110. This stops the machine to permit the work fixtures to be lowered so that the various cutters may be returned without scraping over the finished work surfaces. The operator then closes the manually operated switch 139 to restart the machine which will return at a rapid traverse rate until a dog 185, which is located in a different plane from the dogs 164' and 176, operates the trip lever 186 and moves the selector valve back to a starting position. At the same time, another dog 187 will operate the limit switch 151, thereby breaking the circuit to the holding solenoid 142 which will again cause the solenoid 143 to shift in a direction to release the stop valve and stop the machine.

The other set of milling cutters 20 and 21 are driven from a separate prime mover indicated by the reference numeral 188 in Figure 1, and this motor is connected to the cutters through the same form of transmission utilized for driving the cutters 22 and 23 and, therefore, it is believed that description thereof is not necessary.

Since the operation of the machine is now believed to be apparent from the foregoing description it will be seen that an improved transmission has been provided for automatically and successively milling and broaching a work piece comprising a single prime mover operatively connected to four branch transmissions and that the full power demand of each branch transmission is controlled to occur sequentially and thus maintain within the capacity of the prime mover whereby a smaller capacity prime mover may be utilized than would be required if the maximum power demand of two branches occurred simultaneously.

What is claimed is:

1. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, means connecting the second drive shaft independent of said gear train to the motor shaft including a first reduction gear train from the motor shaft and terminating in a clutch on the second drive shaft for rotation of the second drive shaft at a slow rate, a second reduction gear train from the motor shaft of less reduction than the first reduction gear train and terminating in a clutch on the second drive shaft for rotating the second drive shaft at a faster rate than that imposed by the first reduction gear train, power means for maintaining the first-named clutch engaged and the second-named clutch disengaged during the first portion of the cycle, and means actuated by said second drive shaft and effective on said power means after the above-mentioned first portion of the cycle is substantially completed to reverse said clutch connections and thereby increase the rate of rotation of the second drive shaft during the last portion of the cycle as additional power becomes available in the motor shaft due to the elimination of the load on the first drive shaft.

2. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation theeby, a second drive shaft, means connecting the second drive shaft independent of said gear train to the motor shaft including a first reduction gear train from the motor shaft and terminating in a clutch on the second drive shaft for rotation of the second drive shaft at a slow rate, a second reduction gear train from the motor shaft of less reduction than the first reduction gear train and terminating in a clutch on the second drive shaft for rotating the second drive shaft at a faster rate than that imposed by the first reduction gear train, power means for maintaining the first-named clutch engaged and the second-named clutch disengaged during the first portion of the cycle, means actuated by said second drive shaft and effective on said power means after the above-mentioned first portion of the cycle is substantially completed to reverse said clutch connections and thereby increase the rate of rotation of the second drive shaft during the last portion of the cycle as additional power becomes available in the motor shaft due to the elimination of the load on the first drive shaft, and other means effective at the end of the cycle to cause said power means to disconnect both of said clutches.

3. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, a rack and pinion drive mechanism actuated by the second shaft including a pair of pinions and a power operable backlash eliminator operatively connected to said pinions, a first reduction gear train from the motor shaft and terminating in a clutch on the second drive shaft for rotation of the second drive shaft at a slow rate, a second reduction gear train from the motor shaft of less reduction than the first reduction gear train and terminating in a clutch on the second drive shaft for rotating the second drive shaft at a faster rate than that imposed by the first reduction gear train, power means for maintaining the first-named clutch engaged, the second-named clutch disengaged, and the backlash eliminator effective during the first portion of the cycle, and means effective on said power means after the above-mentioned first portion of the cycle is substantially completed to reverse said clutch connections and release said backlash eliminator and thereby increase the rate of rotation of the second drive shaft during the last portion of the cycle as additional power becomes available in the motor shaft due to the elimination of the load on said first drive shaft.

4. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, means connecting the second drive shaft independent of said gear train to the motor shaft including a first reduction gear train from the motor shaft and terminating in a clutch on the second drive shaft for rotation of the second drive shaft at a slow rate, a second reduction gear train from the motor shaft of less reduction than the first reduction gear train and terminating in a clutch on the second drive shaft for rotating the second drive shaft at a faster rate than that imposed by the first reduction gear train, power means for maintaining the first-named clutch engaged and the second-named clutch disengaged during the first portion of the cycle, means actuated by said second drive shaft and effective on said power means after the above-mentioned first portion of the cycle is substantially completed to reverse said clutch connections and thereby increase the rate of rotation of the second drive shaft during the last portion of the cycle as additional power becomes available in the motor shaft due to the elimination of the load on the first drive shaft, a brake connected to said second drive shaft, and other means effective on said power means at the end of the cycle to disconnect said clutches and cause application of the brake to stop the cycle.

5. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, a first reduction gear train from the motor shaft and terminating in a clutch on the second drive shaft for rotation of the second drive shaft at a slow rate, a second reduction gear train from the motor shaft of less reduction than the first reduction gear train and terminating in a clutch on the second drive shaft for rotating the second drive shaft at a faster rate than that imposed by the first reduction gear train, a rapid traverse gear train from the motor shaft for rotating the second drive shaft in a reverse direction at a rapid traverse rate and terminating in a clutch on the second drive shaft, a source of power, a selective power connector having a first position for maintaining the first-named clutch engaged and the second-named clutch disengaged during the first portion of the cycle, and means effective on said power connector after the above-mentioned first portion of the cycle is substantially completed to position said connector in a second position to reverse said first and second-named clutch connections and thereby increase the rate of rotation of the second drive shaft during the last portion of the cycle as additional power becomes available in the motor shaft due to the elimination of the load on the first drive shaft, and means effective at the end of the cycle to position said connector to maintain the first two-named clutches disengaged and the third-named clutch engaged.

6. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, means connecting the second drive shaft independent of said gear train to the motor shaft including a first reduction gear train from the motor shaft and terminating in a fluid operable clutch on the second drive shaft for rotation of the second drive shaft at a slow rate, a second reduction gear train from the motor shaft of less reduction than the first reduction gear train and terminating in a fluid operable clutch on the second drive shaft for rotating the second drive shaft at a faster rate than that imposed by the first reduction gear train, fluid pressure means for maintaining the first-named clutch engaged and the second-named clutch disengaged during the first portion of the cycle, and means actuated by said second drive shaft and effective on said fluid pressure means after the above-mentioned first portion of the cycle is substantially completed to reverse said clutch connections and thereby increase the rate of rotation of the second drive shaft during the last portion of the cycle as additional power means becomes available in the motor shaft due to the elimination of the load on the first drive shaft.

7. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, means connecting the second drive shaft independent of said gear train to the motor shaft including a first reduction gear train from the motor shaft and terminating in a fluid operable clutch on the second drive shaft for rotation of the second drive shaft at a slow rate, a second reduction gear train from the motor shaft of less reduction than the first reduction gear train and terminating in a fluid operable clutch on the second drive shaft for rotating the second drive shaft at a faster rate than that imposed by the first reduction gear train, fluid pressure means including a selector valve for maintaining the first-named clutch engaged and the second-named clutch disengaged during the first portion of the cycle, means actuated by said second drive shaft and effective on said selector valve after the above-mentioned first portion of the cycle is substantially completed to reverse said clutch connections and thereby increase the rate of rotation of the second drive shaft during the last portion of the cycle as additional power means becomes available in the motor shaft due to the elimination of the load on the first drive shaft, and a stop valve intervening said selector valve and clutches to disconnect fluid pressure from said clutches.

8. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, means connecting the second drive shaft independent of said gear train to the motor shaft including a first reduction gear train from the motor shaft and terminating in a fluid operable clutch on the second drive shaft for rotation of the second drive shaft at a slow rate, a second reduction gear train from the motor shaft of less reduction than the first reduction gear train and terminating in a fluid operable clutch on the second drive shaft for rotating the second drive shaft at a faster rate than that imposed by the first reduction gear train, fluid pressure means including a selector valve for maintaining the first-named clutch engaged and the second-named clutch disengaged during the first portion of the cycle, means actuated by said second drive shaft and effective on said selector valve after the above-mentioned first portion of the cycle is substantially completed to reverse said clutch connections and thereby increase the rate of rotation of the second drive shaft during the last portion of the cycle as additional power means becomes available in the motor shaft due to the elimination of the load on the first drive shaft, a stop valve intervening said selector valve and clutches to disconnect fluid pressure from said clutches, a fluid operable brake on said second drive shaft, and means in said stop valve for connecting fluid pressure to said brake.

9. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, a final gear train actuated by the second drive shaft and including a backlash eliminator, a first reduction gear train from the motor shaft and terminating in a fluid operable clutch on the second drive shaft for rotation of the second drive shaft at a slow rate, a second reduction gear train from the motor shaft of less reduction than the first reduction gear train and terminating in a fluid operable clutch on the second drive shaft for rotating the second drive shaft at a faster rate than that imposed by the first reduction gear train, a source of fluid pressure, a selector valve coupling the pressure to maintain the first-named clutch engaged, the second-named clutch disengaged and application of the backlash eliminator during the first portion of the cycle, and means effective on said selector valve after the above-mentioned first portion of the cycle is substantially completed to reverse said clutch connections and release said backlash eliminator and thereby increase the rate of rotation of the second drive shaft during the last portion of the cycle as additional power becomes available in the motor shaft due to the elimination of the load on the first drive shaft.

10. Transmission means comprising in combination, a motor of predetermined limited power, a motor shaft continuously driven by the motor, a first drive shaft which is under load during only the first portion of a cycle, an uninterruptable gear train connecting the motor shaft to the first drive shaft for continuous rotation thereby, a second drive shaft, a final gear train driven by the second drive shaft and including a fluid operable backlash eliminator, a first reduction gear train from the motor shaft and terminating in a fluid operable clutch on the second drive shaft for rotation of the second drive shaft at a slow rate, a second reduction gear train from the motor shaft of less reduction than the first reduction gear train and terminating in a fluid operable clutch on the second drive shaft for rotating the second drive shaft at a faster rate than that imposed by the first reduction gear train, a rapid traverse gear train from the motor shaft reversely connectible to the second drive shaft by a fluid operable clutch, a selector valve for connecting fluid pressure to the backlash eliminator and the first-named fluid operable clutch during the first portion of the cycle, and means effective on the selector valve after the above-mentioned first portion of the cycle is substantially completed to disconnect pressure from the backlash eliminator and the first-named clutch, and connect pressure to the second-named clutch and thereby increase the rate of rotation of the second drive shaft during the last portion of the cycle as additional power becomes available in the motor shaft due to the elimination of the load on the first drive shaft, and other means effective on the selector valve to disconnect pressure from the second-named fluid operable clutch and connect pressure to the rapid traverse control clutch.

References Cited in the file of this patent

UNITED STATES PATENTS

| Number | Name | Date |
|---|---|---|
| 2,011,000 | Kingsbury | Aug. 13, 1935 |
| 2,079,735 | Doran | May 11, 1937 |
| 2,102,613 | Cole | Dec. 21, 1937 |
| 2,146,810 | Forward | Feb. 14, 1939 |
| 2,302,575 | Romaine | Nov. 17, 1942 |
| 2,465,942 | Sundt | Mar. 29, 1949 |